US008050312B2

(12) United States Patent
Dibiaso et al.

(10) Patent No.: US 8,050,312 B2
(45) Date of Patent: Nov. 1, 2011

(54) SYSTEM AND METHOD FOR MULTI-SOURCE COMMUNICATIONS

(75) Inventors: Eric A. Dibiaso, Kokomo, IN (US); Glenn A. Walker, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 898 days.

(21) Appl. No.: 11/732,896

(22) Filed: Apr. 5, 2007

(65) Prior Publication Data

US 2008/0247444 A1 Oct. 9, 2008

(51) Int. Cl.
*H04B 1/38* (2006.01)

(52) U.S. Cl. .......................................... 375/219; 455/73

(58) Field of Classification Search .................. 375/216; 455/73

See application file for complete search history.

(56) References Cited

U.S. PATENT DOCUMENTS

| | | | | |
|---|---|---|---|---|
| 5,592,517 | A * | 1/1997 | Camp et al. | 375/350 |
| 6,674,339 | B2 * | 1/2004 | Kormanyos | 333/81 A |
| 2006/0146618 | A1 * | 7/2006 | Chang et al. | 365/189.11 |
| 2006/0217935 | A1 * | 9/2006 | Beiermeister et al. | 702/188 |
| 2006/0273854 | A1 * | 12/2006 | Suzuki et al. | 330/151 |

* cited by examiner

*Primary Examiner* — David C. Payne
*Assistant Examiner* — Brian J Stevens
(74) *Attorney, Agent, or Firm* — Jimmy L. Funke

(57) ABSTRACT

A system and method of multi-source communications, including a source provider, a transmitter, a receiver, a summing device, a plurality of delay devices, and a switch. The source provider provides a signal including a first and second signal. The transmitter is in communication with the source provider and the receiver. The receiver is in communication with the transmitter. The summing device combines the first and second signals received by the receiver. The delay device delays at least one of the first and second signals. The switch forms a bypass, such that at least one of the first and second signals bypasses one of the plurality of delay devices.

17 Claims, 1 Drawing Sheet

SYSTEM AND METHOD FOR MULTI-SOURCE COMMUNICATIONS

TECHNICAL FIELD

The present invention is generally directed to a system and method for multi-source communications, and more particularly to a satellite radio system and method for multi-source communications in a satellite radio system.

BACKGROUND OF THE INVENTION

Vehicles can be equipped with a satellite radio receiver, which is typically fixedly installed in the vehicle, as an additional option or a replacement to terrestrial radio receivers. Generally, the satellite radio receivers receive at least one signal directed by a satellite, as compared to the terrestrial radio receiver that receives a terrestrial radio frequency (RF) signal. By transmitting the signal using the satellite, the range and quality of the signal received by the satellite radio receiver is generally increased.

Additionally, handheld satellite radio devices have been developed that function as the satellite radio receivers installed in vehicles. Typically, in both satellite radio receivers installed in vehicles and portable handheld satellite radio receivers, the receiving device receives multiple signals from the satellite and/or a terrestrial repeater signal which is a terrestrial RF signal. For example, the source provider producing the transmission transmits multiple signals that are received by the receiver at different times, which is typically known as time diversity. The time diversity phenomenon allows the satellite radio receiver to use one or a combination of the received signals in order to produce the output. Thus, whether the signals are both received directly from the satellite or one signal is received from a terrestrial repeater, the multiple signals can be combined if the multiple signals are received by the receiver, or the output can be produced by a single signal from either the satellite or the terrestrial repeater.

The time diversity phenomenon is further described in the following example. A satellite radio receiver in a vehicle is receiving two signals that correspond to one another and are delayed by four seconds. The vehicle can travel under a signal blocking obstruction, such as a tree, which prevents the satellite radio receiver from receiving a first signal, and within the four second period pass by the obstruction and receive the second signal. Thus, the receiver can produce an output based only on the second signal. Without using time diversity, the receiver would not be able to compensate for not receiving the first signal, which it did not receive while under the obstruction. Thus, the quality of the output of the receiver would be greatly reduced.

When utilizing time diversity to increase the quality of the signal, there is a substantial increase in the delay from the time the signal is transmitted from the station to the time the receiver receives the signal, when compared to the time it takes to transmit the signal from the station to the satellite and from the satellite to the receiver. Thus, the only delay in a signal that is transmitted without time diversity is the time it takes for the signal to pass from the transmitter, be directed by the satellite, received by the receiver, and the time for modulation and demodulation of the signal, which essentially results in the user receiving the output of the receiver in real-time. Typically, the broadcaster makes the determination of whether or not the signal is transmitted in time diversity and the end user does not have a choice.

Therefore, it is desirable to develop a satellite radio receiver that can be configured by the user to receive multiple signals in a time diversity format, or be configured to produce an output based on a single signal.

SUMMARY OF THE INVENTION

According to one aspect of the present invention, a multi-source communication system is provided that includes a source provider, a transmitter, a receiver, a summing device, a plurality of delay devices, including at least a first delay device and a second delay device, and a switch. The source provider provides a signal including a first signal along a first signal path and a second signal along a second signal path, wherein the first and second signals correspond to one another. The transmitter is in communication with the source provider and receives at least one of the first and second signals. The receiver is in communication with the transmitter, and receives at least one of the first and second signals transmitted by the transmitter. The summing device is in communication with the receiver and combines the first and second signals received by the receiver. The first delay device is in communication between the source provider and the transmitter and delays the first signal. The second delay device is in communication between the receiver and the summing device and delays the second signal. The switch forms a bypass when the switch is closed, such that at least one of the first and second signals bypasses one of the plurality of delay devices.

According to another aspect of the present invention, a multi-source communication system is provided that includes a source provider, and provides a first signal along a first signal path, a second signal along a second signal path, a transmitter, a receiver, a summing device, a first delay device, a second delay device, and a switch. The first and second signals correspond to one another. The transmitter is in communication with the source provider, and receives at least one of the first and second signals. The receiver is in communication with the transmitter, and receives the first and second signals transmitted by the transmitter. The summing device is in communication with the receiver, combines the first and second signals received by the receiver, and an output of the summing device is received by a user. The first delay device is in communication between the source provider and the transmitter and delays the first signal. The second delay device is in communication with the receiver, and delays the second signal. The switch forms a bypass around the second delay device and the summing device when the switch is closed, such that the user receives an output based upon only the second signal.

According to yet another aspect of the present invention, a method for multi-source communication is provided that includes the step of providing a source content provider that provides a signal having at least a first signal along a first signal path and a second signal along a second signal path. The method further includes the steps of transmitting at least the first and second signals by the transmitter, receiving at least one of the first and second signals by a receiver, combining at least the first and second signals by the summing device, and delaying the first signal by the first delay device and the second signal by the second delay device. The method also includes the steps of closing a switch and forming a bypass around the second delay device, and bypassing the second signal around the second delay device, such that the user receives an output based upon only the second signal in substantially real-time.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
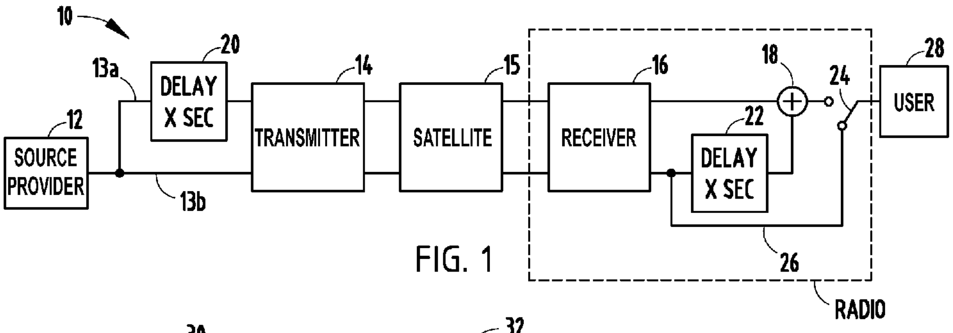
FIG. 1 is a block diagram of a multi-source communication system in accordance with one embodiment of the present invention.

With respect to an embodiment shown in FIG. 1, a multi-source communication system is generally shown at reference indicator 10. The system 10 comprises a source provider 12 that provides a signal that is separated into a first signal that is transmitted along a first signal path 13*a* and a second signal that is transmitted along a second signal path 13*b*. Thus, the first and second signals correspond to one another, as described in greater detail below. A transmitter 14 is in communication with the source provider 12, such that the transmitter 14 receives at least one of the first and second signals emitted from the source provider 12. The system 10 further comprises a receiver 16 that is in communication with the transmitter 14. The receiver 16 receives the signals that are received and transmitted by the transmitter 14. Typically, a satellite 15 can be in communication between the transmitter 14 and receiver 16 for directing or transmitting the signals to the receiver 16 that are transmitted by the transmitter 14, and the signal transmitted by the transmitter 14 and received by the receiver 16 is a satellite radio signal.

A summing device 18 is in communication with the receiver 16, and combines or sums the signals that are received by the receiver 16. The system 10 also includes a plurality of delay devices, including at least a first delay device 20 in the first signal path 13*a* and a second delay device 22 in the second signal path 13*b*. Typically, the first delay device 20 is in communication between the source provider 12 and the transmitter 14 and delays the first signal, and the second delay device 22 is in communication between the receiver 16 and the summing device 18 and delays the second signal. A switch 24 forms a bypass 26 around the second delay device 22 and summing device 18, such that the second signal bypasses the second delay device 22 and summing device 18, as described in greater detail below. Thus, a radio includes at least the receiver 16, the summing device 18, the delay device 22, and the switch 24. A user 28 receives an output from the receiver 16 based upon the first signal, the second signal, or a combination thereof. Thus, when the switch 24 is closed, the bypass 26 is formed around the second delay device 22 and summing device 18, such that the second signal is not delayed by the second delay device 22, and the output is received by the user 28 in substantially real-time.

Typically, the switch 24 is manual actuated in order to open and close the switch 24. However, it should be appreciated by those skilled in the art the switch 24 can be actuated using any suitable manual or automated actuation device. It should further be appreciated by those skilled in the art that the radio can include additional components to process the signals or source data received by the receiver 16, such as but not limited to, demodulators, decoders, the like, or a combination thereof.

When the switch 24 is open, the first signal passes through the first delay device 20, and the second signal passes through the second delay device 22, such that the first and second signals are transmitted in a time diversity format. The delayed first signal and delayed second signal are received by the summing device 18 and combined to produce the output to the user 28. For example, if one of the first or second signals is not received by the receiver 16, and is not communicated to the summing device 18 due to an external signal blocking obstruction, the summing device 18 will produce an output to the user 28 based upon the single received signal. However, if both the first and second signals are received by the receiver 16 and transmitted to the summing device 18, then the two signals will be combined to produce the output to the user 28. Thus, transmitting the signals in a time diversity format can improve the quality of the output to the user 28, in that the user 28 receives an output whether one or both signals are received, whereas if only a single signal is transmitted, and the receiver 16 is obstructed and does not receive the signal, then the output to the user 28 is not based upon the transmitted signal, and results in an un-audible output. When the signals are transmitted in a time diversity format, the output to the user 28 is delayed, as described in greater detail below.

The user 28 can open and close the switch 24, as they desire, in order for the output to be based upon both signals in the time diversity format or only the second signal. When the user 28 has the switch 24 open, such that the output is based upon both signals in the time diversity format, the output is delayed by the predetermined amount of time based upon the amount of time the delay devices 20,22 delay the signal. When the user 28 has the switch 24 closed, the output produced to the user 28 is based only on the second signal that is not delayed, and thus, the user 28 receives the output in substantially real-time. It should be appreciated by those skilled in the art that receiving the second signal in substantially real-time includes the minor delays inherent in the transmission of a signal.

The first and second signals correspond to one another, such that the first and second signals are transmitted in a time diversity format, and are summed or combined to produce an output when the switch 24 is open. Thus, if the time diversity format being used is where substantially identical information is transmitted in the first and second signals, then the first and second signals correspond to one another, and are summed by the summing device 18 when the switch 24 is open. Similarly, if the time diversity format being used is a forward error correction (FEC) code that formats the same data in the first and second signals into different coded bits, then the first and second signals correspond to one another, and are combined by the summing device 18 when the switch 24 is open. Thus, it should be appreciated by those skilled in the art that the summing device 18 can be an FEC decoder that decodes and combines the first and second signals, or another suitable device.

Figure 2:
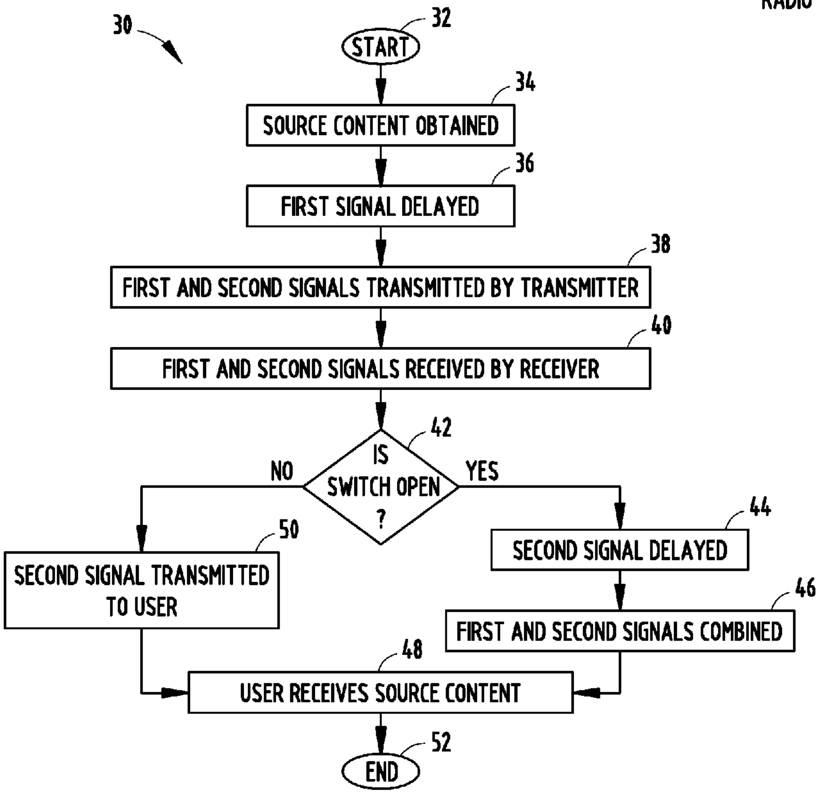
FIG. 2 is a flow chart that illustrates a method of multi-source communication in accordance with one embodiment of the present invention.

In reference to FIG. 2, a method of multi-source communication is generally shown at reference indicator 30. The method 30 begins at step 32, and proceeds to step 34, where source content is obtained. Typically, the source content includes satellite radio signals. At step 36, a first signal in the first signal path 13*a* is delayed by the first delay device 20. Next, at step 38, the first and second signals are transmitted by the transmitter 14. The first and second signals are then received by the receiver 16 at step 40.

The method 30 then proceeds to decision step 42, where it is determined if the switch 24 is open. If it is determined that the switch 24 is open, then the method 30 proceeds to step 44, where the second signal in the second signal path **13*b* is delayed by the second delay device 22. Then the delayed first and second signals are combined by the summing device 18 at step 46. The user 28 receives the output based upon the first and second signals at step 48**.

However, if it is determined that the switch 24 is not open at decision step 42, the method 30 proceeds to step 50, where the second signal is transmitted to the user 28 by the bypass 26. Thus, the second signal bypasses the second delay device 22 and the summing device 18. The method 30 then proceeds to step 48, where the user 28 receives the output based upon the second signal, and the method 30 ends at step 52.

Figure 3:
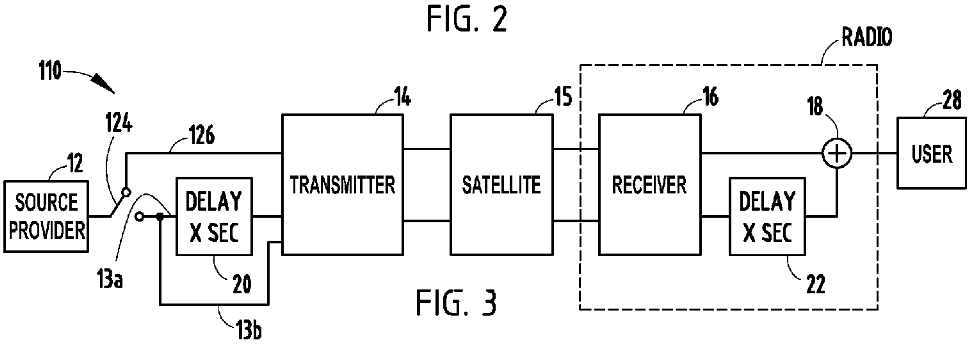
FIG. 3 is a block diagram of a multi-source communication system in accordance with another embodiment of the present invention.

In reference to FIG. 3, an alternate embodiment of the multi-source communication system is generally shown at reference indicator 110, wherein like reference indicators represent like elements. The system 110 comprises the source provider 12, the receiver 16, the transmitter 14, the summing device 18, the first delay device 20, the second delay device 22, and the user 28. The system 110 further includes a switch 124 that is controlled by the source provider 12. A bypass 126 bypasses the first signal around the first delay device 20 when the switch 124 is closed. Further, when the switch 124 is closed, the second signal is not transmitted to the transmitter 14, such that the transmitter 14 only receives the first signal that passes through the bypass 126. The transmitter 14 only transmits the first signal to the receiver 16 and the user 28 receives an output based upon the first signal in substantially real-time.

However, when the switch 124 is open, the source provider 12 is connected to the transmitter 14, such that the first and second signals are transmitted in a time diversity format. The transmitter 14 receives the first signal that is delayed by the first delay device 20 and the second signal. The receiver 16 then receives the delayed first signal from the transmitter 14 and the second signal. The second signal is delayed by the second delay device 22. The delayed first and second signals are combined by the summing device 18 and the user 28 receives an output based upon the combined signals. Thus, the source provider 12 determines when the user 28 will receive an output based upon signals in the time diversity format or in substantially real-time.

It should be appreciated by one having ordinary skill in the art, that in this embodiment, the switch 124 is located between the source provider 12 and the transmitter 14 before the signals are separated into the first and second signals. It should further be appreciated by one having ordinary skill in the art that the source provider 12 transmits multiple signals, including at least the first and second signals, such that the first and second signals correspond to one another. Additionally, the delay devices 20,22 and summing device 18 can be separate devices or integrated with other parts of the system 10,110, such as the transmitter 14, the receiver 16, or the like.

By way of explanation and not limitation, in operation, the system 10, 110, and method 30 are used to provide an output in substantially real-time when the source provider 12 or user 28 desires substantially real-time content. Typically, receiving signals that are in a time diversity format is desired when the receiver 16 could be obstructed at anytime. For example, when the receiver 16 is mobile, such as when the receiver 16 is in a vehicle, the receiver 16 is a handheld device, or the like. Thus, receiving signals in a time diversity format is not necessary when the receiver 16 is substantially stationary, such that there is a limited possibility of an obstruction. One example of this is when the user 28 is at a sporting event, and the user 28 is listening to the broadcast and desires a substantially real-time output, rather than the delayed output. Thus, the user 28 can close switch 24 to receive a real-time output since it is unnecessary to receive an output based upon signals in a time diversity format since the location of the user 28 is not being changed with which an obstruction of the signals is possible at anytime. Therefore, the user 28 has the ability to receive an output based upon signals that are in a time diversity format when the receiver 16 is mobile, and receive a substantially real-time output based upon a single signal on the same receiver 16 when the receiver 16 is not mobile.

Alternatively, when the system 110 is used, the source provider 12 can determine to transmit a signal that results in a substantially real-time output by closing switch 124. Thus, all users 28 would receive a substantially real-time output based upon a single signal. The source provider 12 could broadcast signals in a time diversity format on one frequency or channel so the user 28 that is mobile can receive an output based upon signals in a time diversity format, and the source provider 12 could broadcast a single signal on another frequency or channel so a non-mobile user 28 can receive an output in substantially real-time.

Advantageously, the user 28 has the ability to receive a delayed output based upon signals in a time diversity format when the user 28 and/or receiver 16 are mobile and a substantially real-time output based upon a single signal with the same receiver 16. The user 28 is not required to purchase additional equipment and the source provider 12 can transmit a single broadcast using signals in a time diversity format.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A multi-source wireless communication system comprising:

a source provider that provides a signal which is separated into a first signal transmitted along a first signal path and a second signal transmitted along a second signal path, wherein said first and second signals correspond to one another;

a transmitter in communication with said source provider, wherein said transmitter receives of said first and second signals;

a radio including a receiver in communication with said transmitter through a wireless network, wherein said receiver receives of said first and second signals transmitted by said transmitter;

a summing device in communication with said receiver, wherein said summing device combines said first and second signals received by said receiver; and a plurality of delay devices including at least a first delay device and a second delay device, wherein said first delay device is in communication between said source provider and said transmitter and delays said first signal, and said second delay device is in communication between said receiver and said summing device and delays said second signal, said radio including a switch manually operable by a user of said radio to selectively form a bypass around one of said delay devices, whereby said switch is manually selectively operable between a closed position wherein a single, non-delayed signal path is established between the transmitter and receiver, and an open position wherein both said signal paths are established between the transmitter and receiver and are combined within the receiver, wherein said plurality of delay devices delay said first and second signals in a substantially equal amount of time, such that an output received by a user based upon said first and second signals is delayed.

2. The system of claim 1, wherein when said switch is closed said bypass is formed around said second delay device, such that said second signal is not delayed by said second delay device.

3. The system of claim 2, wherein said bypass is formed around said second delay device and said summing device.

4. The system of claim 1, wherein when said switch is open, said first signal passes through said first delay device and said second signal passes through said second delay device.

5. The system of claim 1, wherein when said switch is open, an output from said summing device based upon at least one of said first and second signals is received by a user.

6. The system of claim 1, wherein when said switch is closed, an output based upon one of said first and second signals is received by a user in substantially real-time.

7. The system of claim 1, wherein when said switch is closed, said bypass is formed around said first delay device, such that said first signal is not delayed.

8. The system of claim 7, wherein said transmitter receives and transmits only said first signal.

9. The system of claim 1 further comprising at least one satellite in communication between said transmitter and said receiver, wherein said signal is a satellite radio signal.

10. A multi-source wireless communication system comprising:

a source provider that provides a signal that is separated into a first signal transmitted along a first signal path and a second signal transmitted along a second signal path, wherein said first and second signals correspond to one another;

a transmitter in communication with said source provider, wherein said transmitter receives said first and second signals;

a radio including a receiver in communication with said transmitter through a wireless network, wherein said receiver receives said first and second signals transmitted by said transmitter;

a summing device in communication with said receiver, wherein said summing device combines said first and second signals received by said receiver and an output of said summing device is received by a user;

a first delay device in communication between said source provider and said transmitter in said first communication path, wherein said first delay device delays said first signal; and a second delay device is in communication between said receiver and said summing device in said second communication path, wherein said second delay device delays said second signal, said radio including a switch manually selectively operable by a user of said radio in a closed position to form a bypass around said second delay device and said summing device to establish a single non-delayed path between the transmitter and user, and an open position wherein both said signal paths are combined within the radio, such that said user receives an output based upon only said second signal when said switch is closed, wherein said first and second delay devices delay said first and second signals a substantially equal amount of time, such that an output received by said user based upon said first and second signals is delayed.

11. The system of claim 10, wherein when said switch is open said first signal passes through said first delay device and a second signal passes through said second delay device.

12. The system of claim 10, wherein when said switch is closed, an output based upon said second signal is received by said user in substantially real-time.

13. The system of claim 10 further comprising at least one satellite in communication between said transmitter and said receiver, wherein said signal is a satellite radio signal.

14. A method for multi-source wireless communication, said method comprising the steps of:

providing a source provider that provides a signal which is segregated into at least a first signal transmitted along a first signal path and a second signal transmitted along a second signal path;

transmitting said first and second signals by a transmitter through a wireless network;

receiving of said first and second signals by a radio receiver through said wireless network;

providing a user accessible switch in said radio receiver which is manually operable by a user of said radio receiver between an open position and a closed position;

delaying said first signal by a first delay device and said second signal by a second delay device when said switch is open;

combining said first and second signals by a summing device located is said radio receiver when the switch is open;

manually closing said switch to affect forming a bypass around said second delay device; and bypassing said second signal around said second delay device, such that a user receives a non-delayed output based upon only said second signal in substantially real-time, wherein said first and second delay devices delay said first and second signals a substantially equal amount of time.

15. The method of claim 14, wherein when said switch is open, said second signal passes through said second delay device and said user receives a delayed output based upon at least one of said first and second signals.

16. The method of claim 14 further comprising the step of providing at least one satellite in communication between said transmitter and said receiver, wherein said signal is a satellite radio signal.

17. The method of claim 14, wherein said bypass bypasses said second signal around said second delay device and said summing device.

* * * * *